United States Patent
Kawasaki et al.

(10) Patent No.: US 12,418,624 B2
(45) Date of Patent: Sep. 16, 2025

(54) RECORDING CONTROL APPARATUS, RECORDING CONTROL METHOD, AND PROGRAM

(71) Applicant: JVCKENWOOD Corporation, Yokohama (JP)

(72) Inventors: Masaru Kawasaki, Yokohama (JP); Wataru Katase, Yokohama (JP); Masaki Goto, Yokohama (JP); Tsuyoshi Watanabe, Yokohama (JP); Takeshi Ibaraki, Yokohama (JP); Nobuyuki Matsukawa, Yokohama (JP)

(73) Assignee: JVCKENWOOD CORPORATION, Yokohama (JP)

(*) Notice: Subject to any disclaimer, the term of this patent is extended or adjusted under 35 U.S.C. 154(b) by 0 days.

(21) Appl. No.: 17/859,320

(22) Filed: Jul. 7, 2022

(65) Prior Publication Data

US 2022/0345661 A1  Oct. 27, 2022

Related U.S. Application Data

(63) Continuation of application No. PCT/JP2020/044057, filed on Nov. 26, 2020.

(30) Foreign Application Priority Data

Jan. 31, 2020 (JP) ................................. 2020-014980
Sep. 25, 2020 (JP) ................................. 2020-160575

(51) Int. Cl.
*H04N 5/77* (2006.01)
*G06V 20/40* (2022.01)
(Continued)

(52) U.S. Cl.
CPC ............... *H04N 5/77* (2013.01); *G06V 20/41* (2022.01); *G06V 20/44* (2022.01); *G06V 20/58* (2022.01);
(Continued)

(58) Field of Classification Search
None
See application file for complete search history.

(56) References Cited

U.S. PATENT DOCUMENTS 5,969,755 A * 10/1999 Courtney .............. G06F 16/786
  375/E7.263
2002/0141637 A1 * 10/2002 Brodsky ................ G06T 7/248
  382/165

(Continued)

FOREIGN PATENT DOCUMENTS

JP  2003069987 A  3/2003
JP  201079825 A  4/2010

(Continued)

*Primary Examiner* — Hung Q Dang
(74) *Attorney, Agent, or Firm* — Procopio, Cory, Hargreaves & Savitch LLP

(57) ABSTRACT

A recording control apparatus includes: a captured data acquisition unit configured to acquire captured data from an image capturing apparatus; an event detection unit configured to detect an occurrence of an event; a captured data analysis unit configured to analyze the captured data and thereby detect a predetermined object included in the captured data; and a recording control unit configured to store, as event recording data, the captured data including a video image at a point in time when the event has occurred and the captured data including a video image at a point in time when the object has been detected.

14 Claims, 9 Drawing Sheets

(51) Int. Cl.
  *G06V 20/56* (2022.01)
  *G06V 20/58* (2022.01)
  *G06V 20/62* (2022.01)
  *G06V 40/16* (2022.01)
  *G07C 5/00* (2006.01)
  *H04N 5/91* (2006.01)
  *H04N 23/60* (2023.01)

(52) U.S. Cl.
  CPC .......... *G06V 20/625* (2022.01); *G06V 40/161* (2022.01); *G06V 2201/08* (2022.01)

(56) References Cited

U.S. PATENT DOCUMENTS

| | | | |
|---|---|---|---|
| 2003/0044168 A1 | 3/2003 | Matsukawa | |
| 2007/0260361 A1* | 11/2007 | Etcheson | G07C 5/008 |
| | | | 701/1 |
| 2013/0194419 A1* | 8/2013 | Bhowmick | G06T 7/277 |
| | | | 348/142 |
| 2016/0027290 A1* | 1/2016 | English | H04N 23/66 |
| | | | 340/539.13 |
| 2016/0155004 A1* | 6/2016 | Shiraishi | G08G 1/20 |
| | | | 348/77 |
| 2018/0050800 A1* | 2/2018 | Boykin | G08B 13/1966 |
| 2018/0150750 A1* | 5/2018 | Verdejo | G06N 5/02 |
| 2018/0357484 A1* | 12/2018 | Omata | G08G 1/167 |
| 2019/0222797 A1* | 7/2019 | Teruuchi | G07C 5/04 |
| 2019/0230325 A1 | 7/2019 | Yamada et al. | |
| 2020/0043254 A1* | 2/2020 | Hase | B60W 40/02 |
| 2020/0176029 A1 | 6/2020 | Yamada et al. | |
| 2021/0097302 A1* | 4/2021 | Butcher | G06F 18/24 |
| 2021/0176410 A1* | 6/2021 | Andersson | H04N 23/698 |
| 2022/0217298 A1* | 7/2022 | Kasuya | H04N 7/183 |

FOREIGN PATENT DOCUMENTS

| | | |
|---|---|---|
| JP | 2018124824 A | 8/2018 |
| JP | 2019028760 A | 2/2019 |
| JP | 2019028761 A | 2/2019 |
| JP | 2019117518 A | 7/2019 |
| JP | 2020107103 A * | 7/2020 |

* cited by examiner

RECORDING CONTROL APPARATUS, RECORDING CONTROL METHOD, AND PROGRAM

CROSS REFERENCE TO RELATED APPLICATION

This application is based upon and claims the benefit of priority from Japanese patent application No. 2020-014980, filed on Jan. 31, 2020, and Japanese patent application No. 2020-160575, filed on Sep. 25, 2020, the disclosures of which are incorporated herein in its entirety by reference.

BACKGROUND

The present invention relates to a recording control apparatus, a recording control method, and a program.

A technology, such as a dashboard camera, for recording a video image at a point in time when an event has occurred as an event video image is known. In such a technology, for example, when an event such as a traffic accident has occurred, a video image in a time period before, during, and after the timing at which the event occurs is recorded. A predetermined fixed value is generally used for the duration of this time period. However, in some cases, contents useful for finding out about the situation of a traffic trouble such as a traffic accident cannot be obtained from the video image of which the duration is limited by the fixed value.

In this regard, Japanese Unexamined Patent Application Publication No. 2003-69987 discloses a technique in which video image analysis processing means analyzes a period of time during which there is a motion in a video image captured by a camera, and the analyzed period of time is used as a time period of an event video image.

SUMMARY

According to the technique disclosed in Japanese Unexamined Patent Application Publication No. 2003-69987, it is possible to dynamically set a period of time for which an event video image is recorded. However, according to the technique disclosed in Japanese Unexamined Patent Application Publication No. 2003-69987, since a period of time during which there is a motion in a video image is used as a period of time for which an event video image is recorded, it is not possible to record an appropriate event image in a dynamic environment such as on a road. That is, in a dynamic environment in which, for example, vehicles and people pass through and objects such as trees are shaken by wind, an appropriate event video image cannot be obtained, and contents useful for finding out about the situation of a traffic trouble cannot be recorded. Therefore, there has been a demand to provide a technology capable of recording contents useful for finding out about the situation of a traffic trouble. Further, in the event recording, there has also been a demand to efficiently use a limited capacity for storage of data.

A recording control apparatus according to a first aspect includes:
 a captured data acquisition unit configured to acquire captured data from an image capturing apparatus;
 an event detection unit configured to detect an occurrence of an event;
 a captured data analysis unit configured to analyze the captured data and thereby detect a predetermined object included in the captured data; and
 a recording control unit configured to store, as event recording data, the captured data including a video image at a point in time when the event has occurred and the captured data including a video image at a point in time when the object has been detected.

A recording control method according to a second aspect includes:
 acquiring captured data from an image capturing apparatus;
 detecting an occurrence of an event;
 analyzing the captured data and thereby detecting a predetermined object included in the captured data; and
 storing, as event recording data, the captured data including a video image at a point in time when the event has occurred and the captured data including a video image at a point in time when the object has been detected.

A program according to a third aspect causes a computer to execute:
 a captured data acquisition step of acquiring captured data from an image capturing apparatus;
 an event detection step of detecting an occurrence of an event;
 a captured data analysis step of analyzing the captured data and thereby detecting a predetermined object included in the captured data; and
 a recording control step of storing, as event recording data, the captured data including a video image at a point in time when the event has occurred and the captured data including a video image at a point in time when the object has been detected.

DETAILED DESCRIPTION

Embodiments of the present invention will be described hereinafter with reference to the drawings. Note that, for the clarification of the description, the following descriptions and the drawings are partially omitted and simplified as appropriate. Further, the same elements are denoted by the same reference symbols throughout the drawings, and redundant descriptions are omitted as necessary.

First Embodiment

Figure 1:
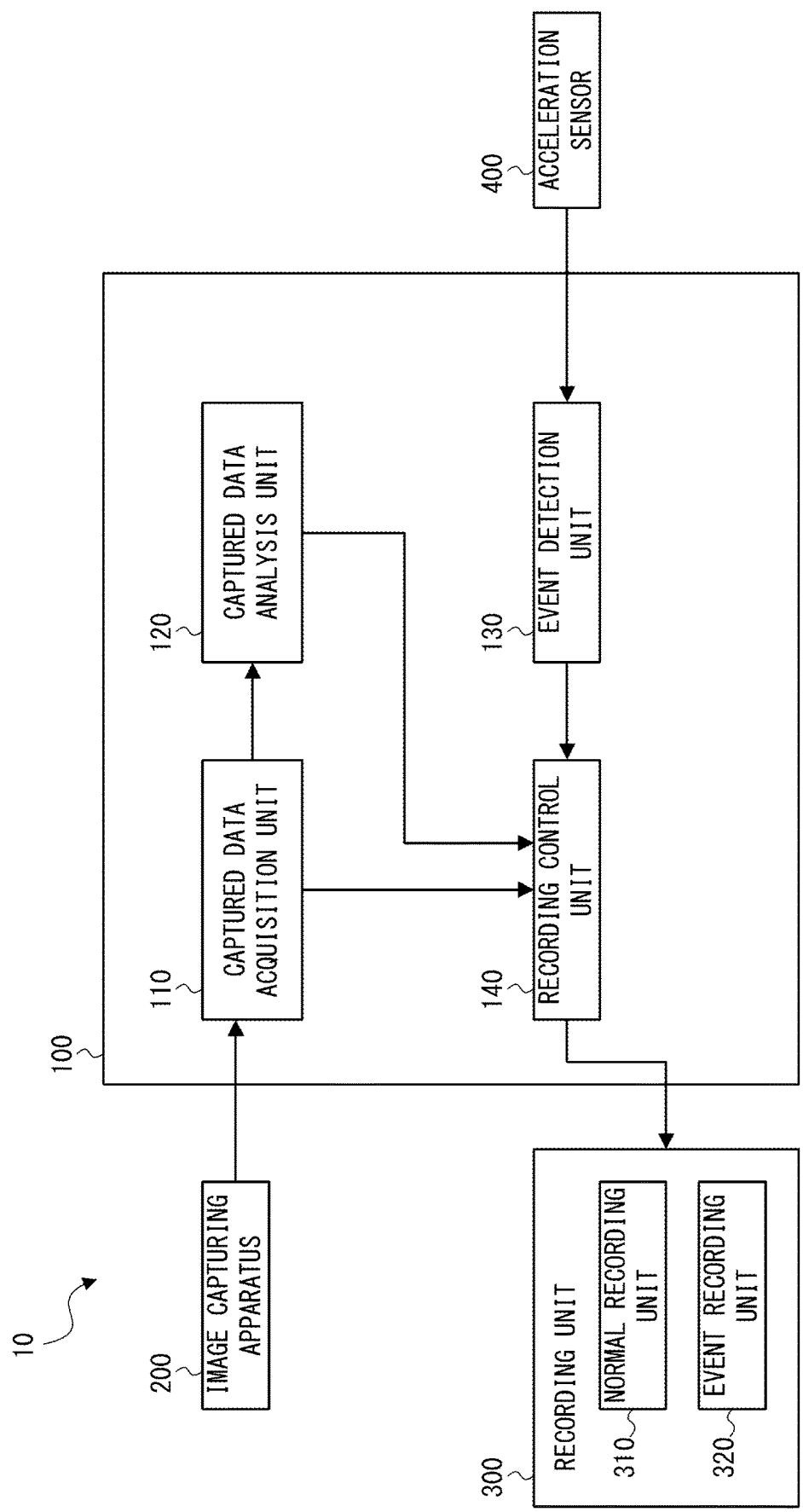
FIG. 1 is a schematic diagram showing an example of a configuration of a recording system according to an embodiment.

FIG. 1 is a schematic diagram showing an example of a configuration of a recording system 10 according to an embodiment. The recording system 10 includes a recording control apparatus 100, an image capturing apparatus 200, a recording unit 300, and an acceleration sensor 400.

In this embodiment, the recording system 10 is, for example, a system mounted on a vehicle. In this case, the recording system 10 is also referred to as a dashboard camera. Note that although the vehicle is, for example, an automobile having four or more wheels, it may instead be a motorcycle having two wheels.

The image capturing apparatus 200 is, for example, a camera. The image capturing apparatus 200 captures a periphery of a vehicle and generates captured data, which is data of the captured video image. The image capturing apparatus 200 may be, for example, a camera that captures an area in the direction to the front of the vehicle, a camera that captures an area in the direction to the rear of the vehicle, or a camera that captures an area in the direction to the side of the vehicle. Further, a plurality of the image capturing apparatuses 200 may be provided. Further, one image capturing apparatus 200 may capture the entire periphery around the vehicle. The image capturing apparatus 200 outputs the captured data to the recording control apparatus 100.

The recording unit 300 is a storage device that stores captured data. The recording unit 300 is, for example, a storage device composed of a memory card including a flash memory, a non-volatile memory such as a Solid State Drive (SSD) or a Hard Disk Drive (HDD), and a volatile memory of Double-Data-Rate Synchronous Dynamic Random Access Memory (DDR). The recording unit 300 records captured data under the control of the recording control apparatus 100. Note that the recording unit 300 may record sound data of sounds collected by a microphone (not shown) provided in the recording system 10 together with the captured data. Further, in this embodiment, although the recording unit 300 is mounted on a vehicle together with the recording control apparatus 100, the recording unit 300 may instead be connected to the recording control apparatus 100 by radio communication. For example, the recording unit 300 may be a mobile terminal such as a smartphone, or an external server.

The recording unit 300 includes a normal recording unit 310 and an event recording unit 320. The normal recording unit 310 is composed of a non-volatile memory and a volatile memory, and temporarily stores data in the volatile memory and then records it in the non-volatile memory. The normal recording unit 310 records captured data so that it can be written. That is, when the storage capacity is insufficient, for example, the normal recording unit 310 can delete captured data in chronological order, and new captured data can be stored in a free storage area that is obtained as a result of the deletion. The event recording unit 320 is composed of a non-volatile memory. The event recording unit 320 records captured data as event recording data. The event recording data, which is write-protected data, is captured data related to the detected event. That is, even when the time elapses, event recording data is not deleted unless a user intentionally performs a deletion operation or the like. The normal recording unit 310 may be a recording area that is determined in advance to be a storage area in which data can be written, and the event recording unit 320 may be a recording area that is determined in advance to be a write-protected storage area. However, such determinations may not be made in advance for a storage area. A flag indicating that data is protected from being written may be added to data to be protected from being written and the data to which the flag has been added is stored, whereby the data may be protected from being written. In this case, the non-volatile memory of the normal recording unit 310 and the non-volatile memory of the event recording unit 320 may be shared by the recording unit 300.

The acceleration sensor 400, which is, for example, a three-axis acceleration sensor, detects an acceleration of a vehicle. The acceleration sensor 400 is installed at a desired position on the vehicle. The acceleration sensor 400 may be built into the recording control apparatus 100. The acceleration sensor 400 detects the acceleration applied to the acceleration sensor 400, and then provides the detected acceleration to an event detection unit 130 of the recording control apparatus 100. Note that the acceleration sensor 400 may be a one-axis or two-axis acceleration sensor instead of the three-axis acceleration sensor.

The recording control apparatus 100 includes a captured data acquisition unit 110, a captured data analysis unit 120, the event detection unit 130, and a recording control unit 140. Processing of each component of the recording control apparatus 100 may be implemented, for example, by executing a program. In this case, the recording control apparatus 100 has a hardware configuration, for example, as shown in FIG. 2, and a processor 150 loads software (a computer program) from a memory 151 and executes the loaded software, thereby performing processing performed by each of the captured data acquisition unit 110, the captured data analysis unit 120, the event detection unit 130, and the recording control unit 140.

The memory 151 is composed of, for example, a combination of a volatile memory and a non-volatile memory. The memory 151 is used to store software (a computer program) including at least one instruction executed by the processor 150, and data used in various types of processing performed by the recording control apparatus 100.

The processor 150 may be, for example, a microprocessor, a Micro Processor Unit (MPU), or a Central Processing Unit (CPU). The processor 150 may include a plurality of processors.

Figure 2:
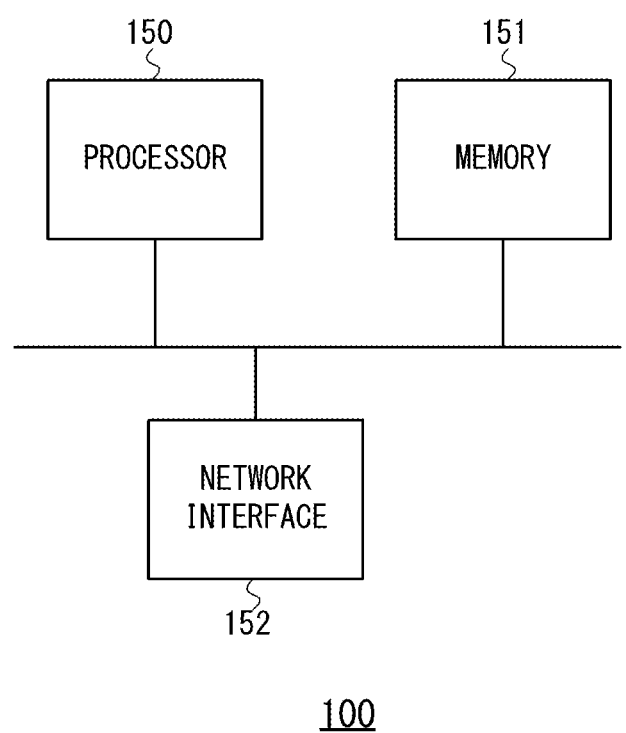
FIG. 2 is a block diagram showing an example of a hardware configuration of a recording control apparatus according to the embodiment.

Note that, as shown in FIG. 2, the recording control apparatus 100 may include a network interface 152 for communicating with other apparatuses. The network interface 152 may include, for example, a network interface card (NIC).

As described above, the recording control apparatus 100 may have functions as a computer.

Further, the above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The processing performed by each of the captured data acquisition unit 110, the captured data analysis unit 120, the event detection unit 130, and the recording control unit 140 will be described below.

The captured data acquisition unit 110 acquires captured data from the image capturing apparatus 200. That is, the captured data acquisition unit 110 acquires captured data, which is data of a video image captured by the image capturing apparatus 200.

The event detection unit 130 detects the occurrence of an event. In this embodiment, the event specifically refers to a traffic trouble. The traffic troubles include not only a traffic accident but also dangerous driving such as a sudden stop or a sudden start of a vehicle. In this embodiment, the event detection unit 130 acquires the acceleration of the vehicle on which the recording control apparatus 100 is mounted from the acceleration sensor 400, and detects whether or not an event has occurred based on the acquired acceleration. Specifically, the event detection unit 130 determines that an event has occurred when an acceleration equal to or greater than a predetermined threshold is detected.

Note that the event detection unit 130 may detect the occurrence of an event by other methods. For example, the event detection unit 130 may determine that an event has occurred when a switch (not shown) provided in the recording control apparatus 100 or the like is operated. In this case, a user operates the switch when a traffic trouble has occurred. Note that, in this case, the recording system 10 may not include the acceleration sensor 400. Further, the occurrence of an event may be detected based on vehicle control information on such actions as sudden braking or abruptly turning the steering wheel instead of using the acceleration sensor 400.

When the event detection unit 130 detects the occurrence of an event, it outputs to the recording control unit 140 an event recording instruction signal instructing that captured data is to be stored as event recording data. Note that the event recording instruction signal may include the time when the occurrence of the event has been detected.

In order to store a scene including a predetermined object as event recording data, the captured data analysis unit 120 analyzes captured data and thereby detects the predetermined object included in the captured data. When there are a plurality of image capturing apparatuses 200, the captured data analysis unit 120 performs analysis on captured data captured by each of the image capturing apparatuses 200. When the captured data analysis unit 120 has detected a predetermined object, the captured data analysis unit 120 notifies the recording control unit 140 about time information indicating at what point in time the video image includes the object. When the captured data analysis unit 120 has detected a plurality of predetermined objects, it may notify the recording control unit 140 about time information indicating at what point in time the video image includes the object for each object.

In this embodiment, the predetermined object is a license plate of a vehicle. In this embodiment, not only a video image captured at the time when the event has occurred but also a video image including the license plate of a vehicle are stored as event recording data. This vehicle may be a vehicle in which a witness to the traffic trouble is riding or a vehicle in which the opposing party of the traffic trouble is riding. Therefore, by storing the video image including such a vehicle as event recording data, it is possible to obtain a clue to identify the witness to the traffic trouble or the parties concerned in the traffic trouble. That is, it is possible to record contents useful for finding out about the situation of the traffic trouble.

The captured data analysis unit 120 analyzes captured data by using known image recognition processing, and detects a license plate of a vehicle included in the captured data. The captured data analysis unit 120 may detect a license plate having a size equal to or larger than a predetermined size included in the video image. Note that the predetermined size refers to, for example, a size that the license plate can be recognized by the captured data analysis unit 120. When the license plate having a size equal to or larger than the predetermined size is included in the captured data, the vehicle with this license plate is a vehicle that was present within a certain distance from the image capturing apparatus 200. Thus, it is considered that the above vehicle is relatively likely to be a vehicle in which the parties concerned in the traffic trouble or the witness to the traffic trouble was riding. Therefore, by detecting a license plate having a size equal to or larger than a predetermined size, it is possible to record contents more useful for finding out about the situation of a traffic trouble.

The captured data analysis unit 120 may analyze captured data of the video image captured before the point in time when the event has occurred, captured data of the video image captured after the point in time when the event has occurred, or both.

In this embodiment, an event recording instruction signal is also output to the captured data analysis unit 120, and when the captured data analysis unit 120 receives the event recording instruction signal, it analyzes captured data around the point in time when the event has been detected. For example, the captured data analysis unit 120 analyzes captured data for a predetermined period of time (e.g., 10 minutes) during which an analysis is to be performed, which period of time starts at the timing when the event has been detected. This period of time during which an analysis is to be performed is set to be longer than a normal period of time (e.g., 30 seconds) for event recording data. Note that it may not be necessary to set the period of time during which an analysis is to be performed. However, in this case, event recording data including a vehicle captured at a time that is significantly distant in time from the timing when the event has been detected may be stored. That is, event recording data including a vehicle which it is unlikely to be the vehicle in which the witness to the traffic trouble or the parties concerned in the traffic trouble were riding may be stored.

The recording control unit 140 performs control so that captured data for a video image captured by the image capturing apparatus 200 is recorded in the recording unit 300. When there are a plurality of image capturing apparatuses 200, the recording control unit 140 performs control so that captured data for each video image captured by each respective one of the image capturing apparatuses 200 is recorded in the recording unit 300.

When an event recording instruction signal is not output from the event detection unit 130, the recording control unit 140 continues to record captured data in the normal recording unit 310. That is, when no event has been detected, the recording control unit 140 records captured data acquired by the captured data acquisition unit 110 in the normal recording unit 310 so that it can be written. Continuing to record captured data so that it can be written as described above is referred to as loop recording or normal recording. Further, when an event recording instruction signal is output from the event detection unit 130, the recording control unit 140 records captured data in the event recording unit 320. That is, when the event has been detected, the recording control unit 140 stores captured data including the video image at the point in time when the event has occurred as event recording data. For example, the recording control unit 140 continues normal recording or loop recording of captured data regardless of whether or not an event recording instruction signal is output, and when an event has been detected, the recording control unit 140 copies in the event recording unit 320 captured data in the period of time during which data is to be stored as event recording data among pieces of captured data stored in the normal recording unit 310, thereby storing event recording data. At this time, the captured data may be copied in the event recording unit 320 from the volatile memory of the normal recording unit 310, or may be copied in the event recording unit 320 from the non-volatile memory of the normal recording unit 310. Note that storing a video image as event recording data is referred to as event recording.

At the time of event recording, the recording control unit 140 adjusts a period of time during which a video image is stored as event recording data so that it includes the point in time when a predetermined object has been detected by the captured data analysis unit 120. For example, when the captured data analysis unit 120 detects a license plate having a size equal to or larger than a predetermined size included in the video image, the recording control unit 140 adjusts a period of time during which a video image is stored as event recording data so that it includes the point in time when this license plate having a size equal to or larger than a predetermined size included in the video image has been detected. The recording control unit 140 determines a time range within which a video image is stored as event recording data based on time information the captured data analysis unit 120 has notified the recording control unit 140 about; that is, time information indicating at what point in time the video image includes a predetermined object.

Figure 3:
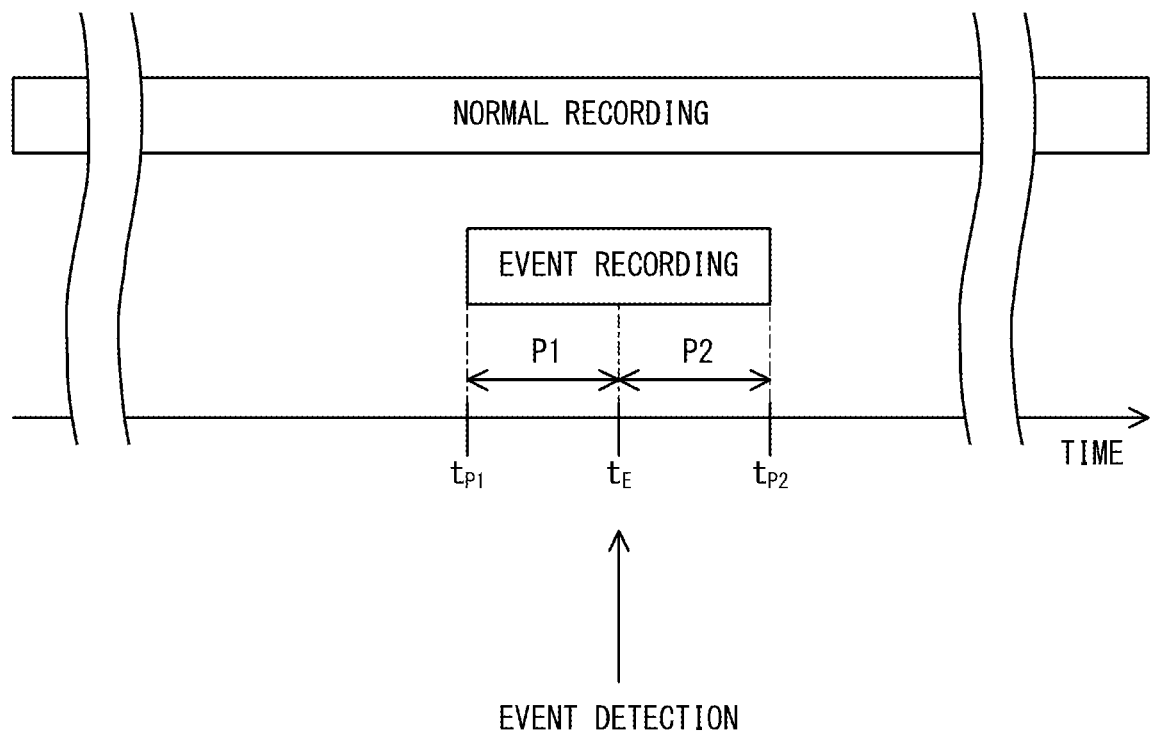
FIG. 3 is a schematic diagram for explaining event recording according to a comparative example.

FIG. 3 is a schematic diagram for explaining event recording according to a comparative example. It is assumed here that an event has been detected at a time $t_E$. In this case, in the event recording according to the comparative example, captured data captured for a period of time from a time $t_{P1}$ to a time $t_{P2}$ is stored as event recording data. Note that the time $t_{P1}$ is a time that goes back from the time $t_E$, at which the event has been detected, by a predetermined period of time P1. Further, the time $t_{P2}$ is a time at which a predetermined period of time P2 has elapsed from the time $t_E$ at which the event has been detected. Note that each of the predetermined periods of times P1 and P2 is, for example, about several tens of seconds. When such event recording is performed, captured data captured for a certain period of time, that is, for a period of time defined as the sum of P1 and P2, is stored as event recording data. However, the contents of captured data in this period of time are not necessarily useful for finding out about the situation of a traffic trouble.

In contrast, as described above, in this embodiment, the recording control unit 140 adjusts a period of time during which a video image is stored as event recording data so that it includes the point in time when a predetermined object such as a license plate has been detected. Therefore, it is possible to store event recording data including contents useful for finding out about the situation of a traffic trouble.

Figure 4:
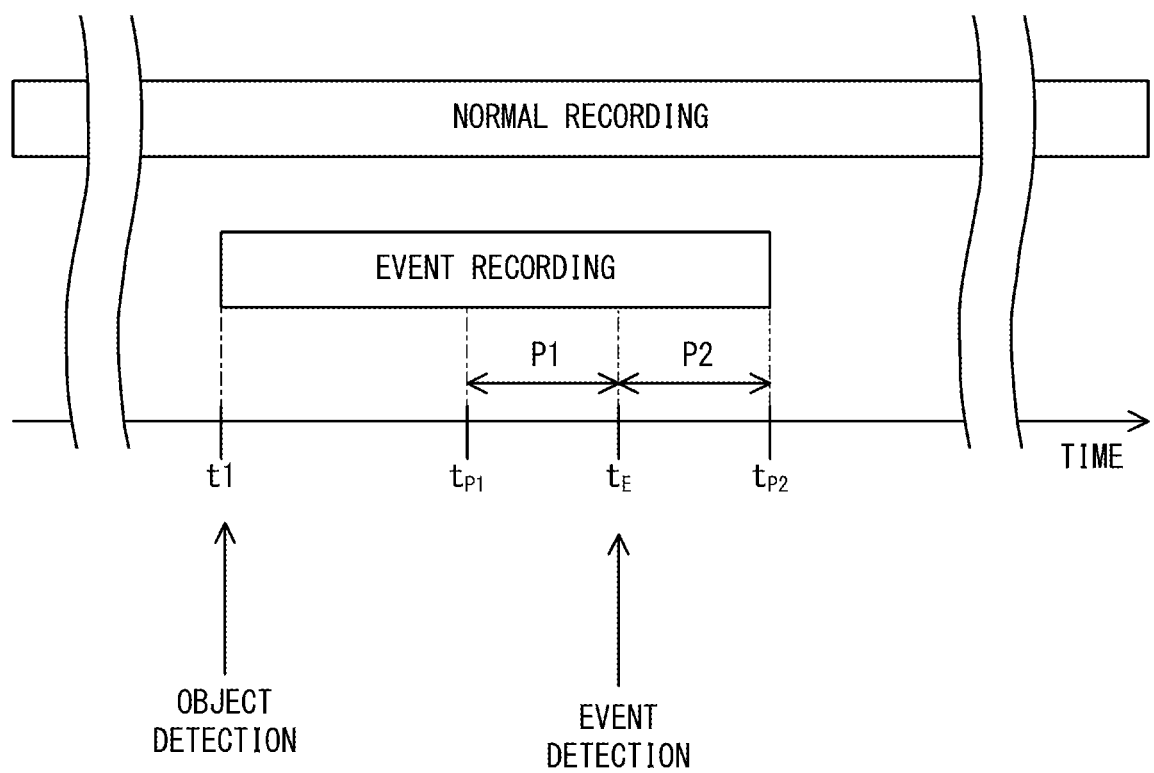
FIG. 4 is a schematic diagram for explaining a storage of event recording data according to the embodiment.

For example, when a predetermined object has been detected by the analysis of the captured data of the video image captured before the point in time when the event has occurred, the recording control unit 140, as shown in FIG. 4, adjusts a period of time during which a video image is stored as event recording data so that it includes the point in time when the object included in the video image before the point in time when the event has occurred has been detected. FIG. 4 is a schematic diagram for explaining a storage of event recording data according to this embodiment. In the example shown in FIG. 4, like in the example shown in FIG. 3, it is assumed that an event has been detected at the time $t_E$. That is, while the recording control unit 140 is performing normal recording, namely, loop recording, the event detection unit 130 detects an event at the time $t_E$. Further, it is assumed that an object has been detected in the video image at a time $t_1$, which is a time before the occurrence of the event, by the analysis performed by the captured data analysis unit 120. In this case, for example, the recording control unit 140 stores captured data captured for the period of time from the time $t_1$ to the above-described time $t_{P2}$ as event recording data. That is, a start point of the video image of the event recording data is set at the time $t_1$, and an end point of the same is set at the time $t_{P2}$. Note that the recording control unit 140 may set the start point to a point in time prior to the time $t_1$ by a predetermined time. Further, in FIG. 4, although the time $t_1$ at which the object is detected is earlier than the time $t_{P1}$, it may instead be the same as or later than the time $t_{P1}$.

By adjusting the start point, the period of time for the video image is adjusted so as to include the point in time when a predetermined object has been detected. Thus, it is possible to store event recording data including contents useful for finding out about the situation of a traffic trouble. In particular, for example, by storing event recording data so as to include the point in time when a vehicle included in the video image before the time when the event has occurred has been detected, it is possible to store an evidence video image specifying the cause of the occurrence of a traffic trouble.

Figure 5:
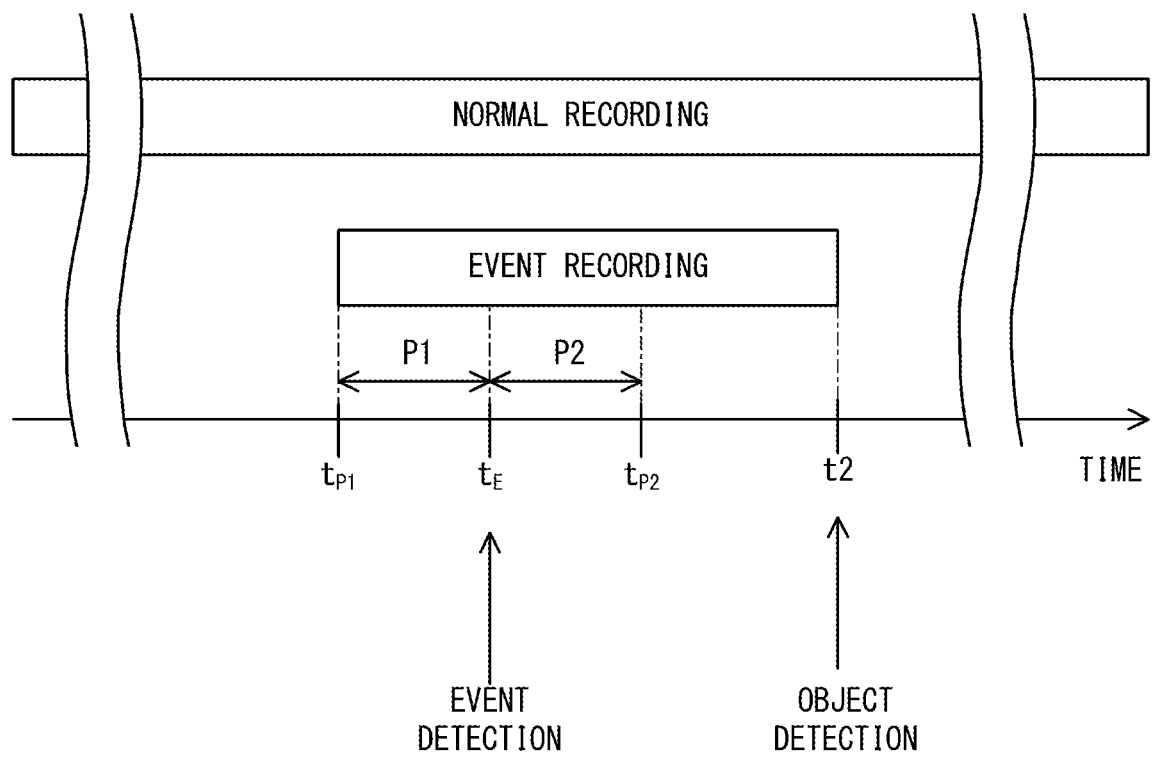
FIG. 5 is a schematic diagram for explaining a storage of event recording data according to the embodiment.

Further, when a predetermined object has been detected by the analysis of the captured data of the video image captured after the point in time when the event has occurred, the recording control unit 140, as shown in FIG. 5, adjusts a period of time during which a video image is stored as event recording data so that it includes the point in time when the object included in the video image after the point in time when the event has occurred has been detected. FIG. 5 is a schematic diagram for explaining a storage of event recording data according to this embodiment. In the example shown in FIG. 5, like in the examples shown in FIGS. 3 and 4, it is assumed that an event has been detected at the time $t_E$. That is, while the recording control unit 140 is performing normal recording, namely, loop recording, the event detection unit 130 detects an event at the time $t_E$. Further, it is assumed that an object has been detected in the video image at a time $t_2$, which is a time after the occurrence of the event, by the analysis performed by the captured data analysis unit 120. In this case, for example, the recording control unit 140 stores captured data for the period of time from the above-described time $t_{P1}$ to the time $t_2$ as event recording data. That is, a start point of the video image of the event recording data is set at the time $t_{P1}$, and an end point of the same is set at the time $t_2$. Note that the recording control unit 140 may set the end point to a point in time after the time $t_2$ by a predetermined time. Further, in FIG. 5, although the time $t_2$ at which the object is detected is later than the time $t_{P2}$, it may instead be the same as or earlier than the time $t_{P2}$.

By adjusting the end point, the period of time of the video image is adjusted so as to include the point in time when a predetermined object has been detected. Thus, it is possible to store event recording data including contents useful for finding out about the situation of a traffic trouble. In particular, for example, by storing event recording data so as to include the time point when a vehicle included in the video image after the time when the event has occurred has been detected, it is possible to store a video image specifying a vehicle that has driven away after the occurrence of a traffic trouble. Further, it is useful for finding a person who has witnessed a situation such as an argument between the concerned parties which occurred after the event has been detected.

Note that the recording control unit 140 may store event recording data so that it includes both the point in time when the object included in the video image before the time when the event has occurred has been detected and the point in time when the object included in the video image after the time when the event has occurred has been detected. That is, for example, event recording data including the video image captured from the above-described time $t_1$ to the above-described time $t_2$ may be stored.

Figure 6:
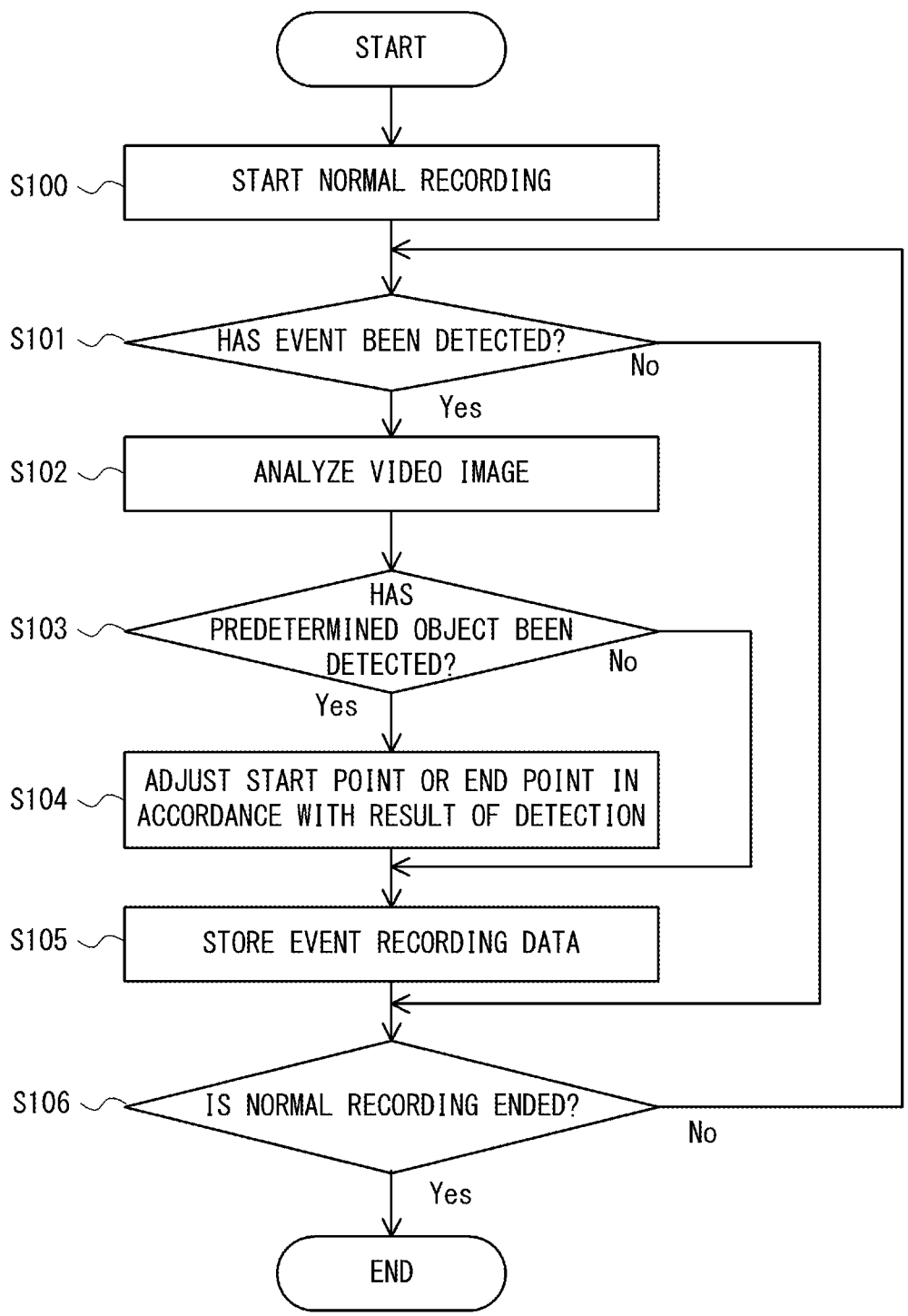
FIG. 6 is a flowchart showing an example of operations performed by the recording control apparatus according to the embodiment.

Next, an operation example of the recording control apparatus 100 will be described. FIG. 6 is a flowchart showing an example of operations performed by the recording control apparatus 100. The example of operations performed by the recording control apparatus 100 will be described below with reference to FIG. 6.

In Step S100, the recording control unit 140 of the recording control apparatus 100 starts normal recording. The normal recording is started by turning on the engine or the power of a vehicle including the recording control apparatus 100 mounted thereon. That is, while a vehicle is in operation, the recording control unit 140 continues to record captured data acquired by the captured data acquisition unit 110 in the normal recording unit 310.

Then, in Step S101, the recording control unit 140 determines whether or not the event detection unit 130 has detected an event. If the recording control unit 140 determines that the event detection unit 130 has detected an event, the process proceeds to Step S102, while if the recording control unit 140 determines that the event detection unit 130 has not detected an event, the process proceeds to Step S106.

In Step S102, the captured data analysis unit 120 analyzes captured data captured around the point in time when the event has been detected. As described above, the captured data analysis unit 120 may analyze the video image for a period of time before the timing when the event has been detected, the video image for a period of time after the timing when the event has been detected, or both.

In Step S103, the recording control unit 140 determines whether or not the captured data analysis unit 120 has detected a predetermined object. That is, the recording control unit 140 determines whether or not the time at which the predetermined object is included in the video image has been specified by the captured data analysis unit 120. If the recording control unit 140 determines that the time at which the predetermined object is included in the video image has been specified, the process proceeds to Step S104, while if it determines that the time at which the predetermined object is included in the video image has not been specified, the process proceeds to Step S105.

In Step S104, the recording control unit 140 adjusts the start point or the end point of the video image of the event recording data in accordance with a result of the detection by the captured data analysis unit 120. That is, as described above, the recording control unit 140 adjusts the start point or the end point, thereby adjusting the period of time during which a video image is stored as event recording data so that it includes the point in time when the object has been detected. After Step S104, the process proceeds to Step S105.

In Step S105, the recording control unit 140 stores event recording data in the event recording unit 320. Note that, when the start point or the end point is adjusted in Step S104, the recording control unit 140 determines the period of time for the video image of the event recording data by using the adjusted start point or end point. On the other hand, if the process in Step S104 is skipped, that is, in the case of No in Step S103, the recording control unit 140 determines the period of time for the video image of the event recording data by using the start point and the end point specified by the above-described predetermined periods of times P1 and P2. After Step S105, the process proceeds to Step S106.

In Step S106, the recording control unit 140 determines whether or not an operation to end normal recording, such as turning off the engine or the power of the vehicle, has been performed. If the recording control unit 140 determines that normal recording is not ended, the process returns to Step S101. On the other hand, if the recording control unit 140 determines that an operation to end normal recording has been performed, the recording control unit 140 ends normal recording.

The first embodiment has been described above. According to this embodiment, the recording control unit 140 stores not only a video image captured at the time when the event has occurred but also a video image including the license plate of the vehicle as event recording data. Therefore, it is possible to record the vehicle in which the witness to the traffic trouble is riding or the vehicle in which the opposing party of the traffic trouble is riding as a video image. Thus, it is possible to record contents useful for finding out about the situation of the traffic trouble.

Note that, in the above-described embodiment, although the license plate of the vehicle is detected as a predetermined object, the vehicle itself may be detected as a predetermined object by the analysis performed using image recognition processing. Further, a characteristic part of the vehicle other than the license plate may be detected.

Second Embodiment

Next, a second embodiment will be described. In the following description, the differences between the second embodiment and the first embodiment will be described, and the descriptions of configurations and processes of the second embodiment similar to those described in the first embodiment will be omitted as appropriate. This embodiment differs from the first embodiment in that the captured data analysis unit 120 detects a person as a predetermined object.

That is, in this embodiment, the captured data analysis unit 120 analyzes captured data by using known image recognition processing and thereby detects a person included in the captured data. Thus, in this embodiment, not only a video image captured at the time when the event has occurred but also a video image including a person are stored as event recording data. This person may be the witness to the traffic trouble or the opposing party of the traffic trouble. Therefore, by storing the video image including such a person as event recording data, it is possible to obtain a clue to identify the witness to the traffic trouble or the parties concerned in the traffic trouble. That is, it is possible to record contents useful for finding out about the situation of the traffic trouble.

Note that the captured data analysis unit 120 may detect the face of a person. By detecting the face of a person, it becomes easier to identify a person included in the video image. Therefore, it is possible to obtain contents more useful for finding out about the situation of a traffic trouble.

The second embodiment has been described above. According to this embodiment, the recording control unit 140 stores not only a video image captured at the time when the event has occurred but also a video image including a person as event recording data. Thus, it is possible to record contents useful for finding out about the situation of the traffic trouble. Note that the first embodiment may be combined with the second embodiment. That is, a person and a license plate of a vehicle may be detected as predetermined objects.

The first and the second embodiments have been described above, and the following modifications may be made to these embodiments.

For example, when the captured data analysis unit 120 detects a plurality of predetermined objects and notifies the recording control unit 140 about time information indicating at what point in time the video image includes the object for each object, the recording control unit 140 may perform control as described below. That is, in this case, the recording control unit 140 may adjust a period of time during which a video image is stored as event recording data so that it includes a predetermined number or more of the objects. Note that the predetermined number is two or larger, which can be freely set. By doing the above, a video image including a plurality of objects can be stored as event recording data. For example, when the witness to the traffic trouble is trying to be found from the video image of the event recording data, the number of objects corresponding to the number of candidate witnesses or the number of candidate license plates of the vehicles in which the witness may be riding is preferably large. As described above, by storing a video image including a plurality of objects, it is possible to obtain a video image more useful for finding out about the situation of a traffic trouble.

Third Embodiment

Figure 7:
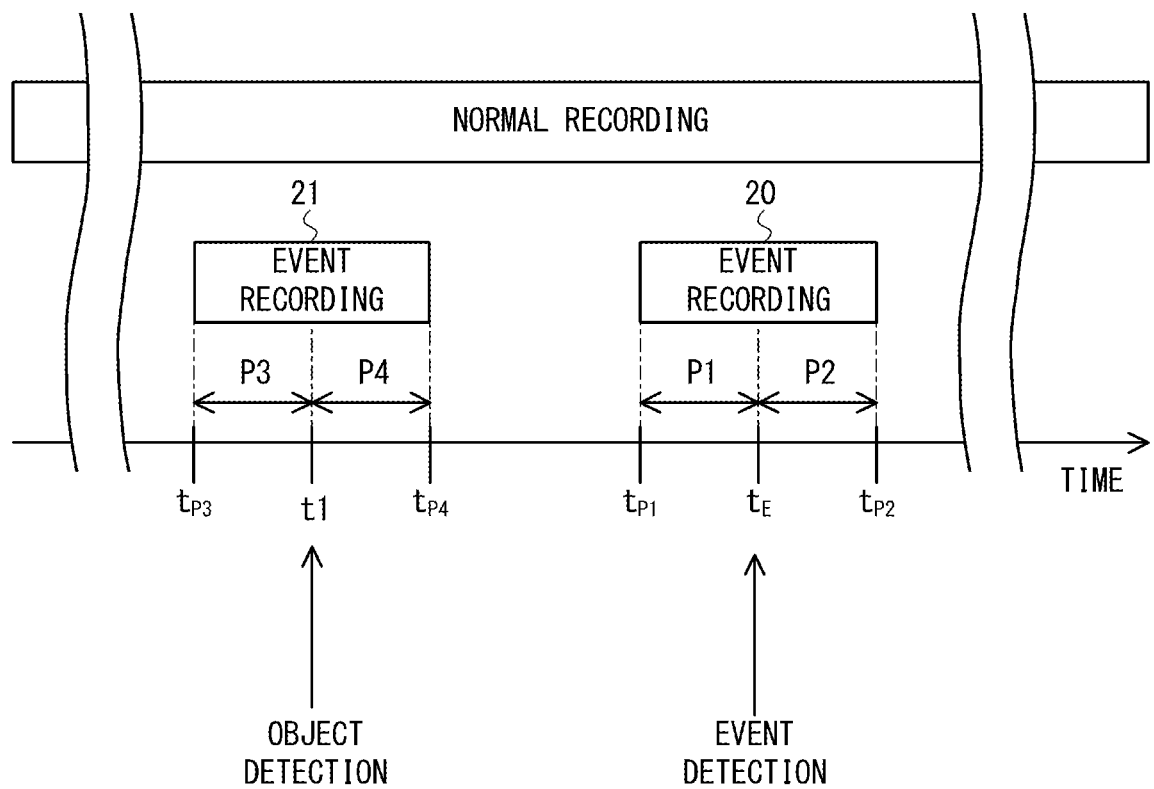
FIG. 7 is a schematic diagram for explaining a storage of event recording data in the embodiment.

In the above-described embodiments, the recording control unit 140 stores, as event recording data, a series of captured data for a series of video images including both the point in time when an event has occurred and the point in time when an object has been detected. On the other hand, in this embodiment, the recording control unit 140 adjusts a period of time during which a video image is stored as event recording data so that it includes the point in time when the object has been detected as described below. In this embodiment, the recording control unit 140 associates first captured data, which is captured data including the point in time when the event has occurred, with the second captured data, which is captured data including the point in time when the object included within a predetermined range from the point in time when the event has occurred has been detected, and stores them as event recording data. Note that the predetermined range is, for example, a period of time from the point in time when the event has occurred to the point in time when an object has been detected, or a distance described later. In this embodiment, for example, as shown in FIG. 7, the recording control unit 140 associates captured data 20 captured for a first predetermined period of time including the point in time when the event has occurred with captured data 21 captured for a second predetermined period of time including the point in time when the object has been detected, and stores them as event recording data. Note that the captured data 20 corresponds to the above-described first captured data and the captured data 21 corresponds to the above-described second captured data.

In the example shown in FIG. 7, it is assumed that an event has been detected at the time $t_E$. Further, it is assumed that an object has been detected in the video image at the time $t_1$. In this case, the recording control unit 140 stores captured data captured for the period of time from the time $t_{P1}$ to the time $t_{P2}$ and captured data captured for the period of time from a time $t_{P3}$ to a time $t_{P4}$ as event recording data. Note that the time $t_{P1}$ is a time that goes back from the time $t_E$ at which the event has been detected by the predetermined period of time P1. Further, the time $t_{P2}$ is a time at which the predetermined period of time P2 has elapsed from the time $t_E$ at which the event has been detected. Further, the time $t_{P3}$ is a time that goes back from the time $t_1$ by a predetermined period of time P3. Further, the time $t_{P4}$ is a time at which a predetermined period of time P4 has elapsed from the time $t_1$. By creating event recording data in this way, it is possible to store both a video image captured at the point in time when the event has occurred and a video image captured at the point in time when the object has been detected and omit the storage of captured data captured for the period of time from the time $t_{P4}$ to the time $t_{P1}$. Therefore, it is possible to reduce the consumption of the storage capacity. That is, according to this embodiment, it is possible to reduce the amount of data to be recorded and record contents useful for finding out about the situation of a traffic trouble. Note that, in FIG. 7, although the detection of an object before the occurrence of an event is used as an example, processes similar to those performed in the detection of an object before the occurrence of an event are performed in the detection of an object after the occurrence of an event.

Figure 8:
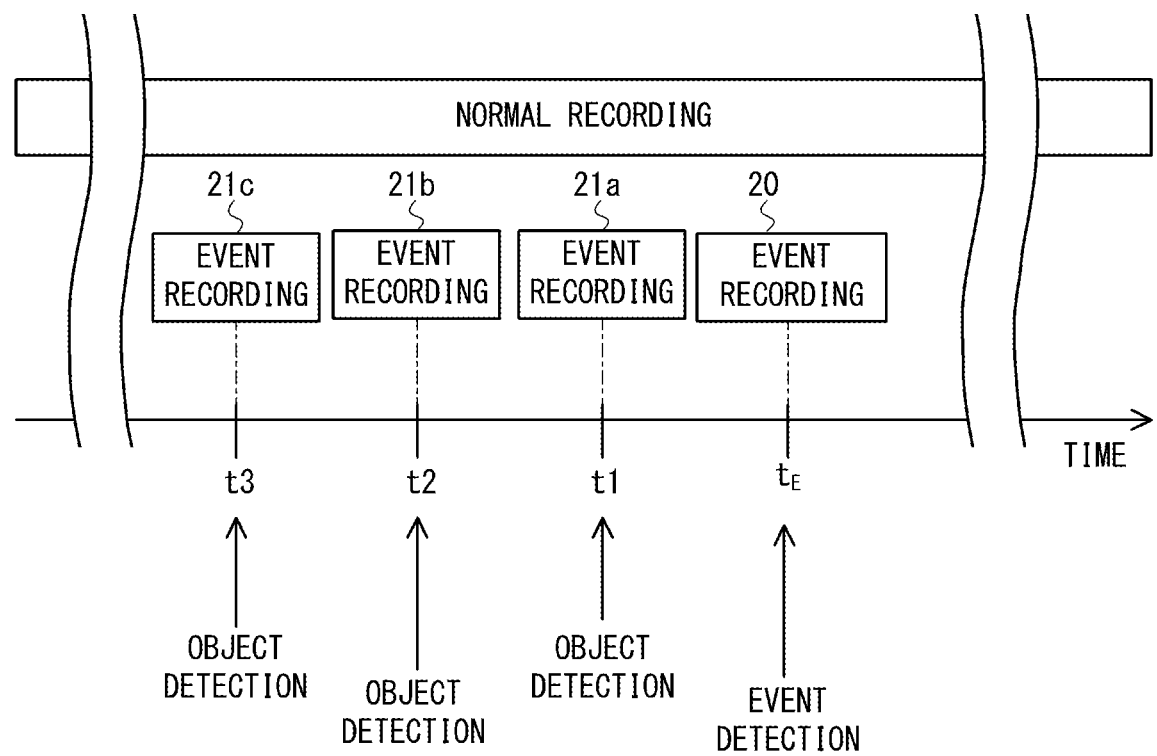
FIG. 8 is a schematic diagram for explaining a storage of event recording data in the embodiment.

FIG. 7 shows an example in which one object has been detected. However, when a plurality of objects have been detected, a plurality of pieces of the second captured data corresponding to the detected objects may be associated with the first captured data and stored as event recording data. FIG. 8 is a diagram showing an example in which event recording data is stored when a plurality of objects have been detected. In the example shown in FIG. 8, an event has been detected at the time $t_E$, and the objects have been detected at the time $t_1$, the time $t_2$, and a time $t_3$, respectively. In this case, the recording control unit 140 associates captured data 21a corresponding to the object that has been detected at the time $t_1$, captured data 21b corresponding to the object that has been detected at the time $t_2$, and captured data 21c corresponding to the object that has been detected at the time $t_3$ with the captured data 20 corresponding to the point in time when the event has occurred, and stores them as one event recording data. In this way, when a plurality of objects have been detected, the recording control unit 140 may associate the second captured data corresponding to a respective one of the detected objects with the first captured data, and stores them as event recording data.

Note that, in the example shown in FIG. 8, although all pieces of the second captured data corresponding to the detected objects are associated with the first captured data, all pieces of the second captured data may not necessarily be associated with the first captured data. In this case, the second captured data to be associated with the first captured data may be selected in accordance with the order of priority. That is, when a plurality of objects have been detected, the recording control unit 140 may associate a predetermined number of pieces of the second captured data, which are selected in accordance with the order of priority among a plurality of pieces of the second captured data corresponding to the detected objects, with the first captured data, and store them as event recording data. For example, the recording control unit 140 may assign a higher priority to the second captured data corresponding to the object detected at a point in time closer to the point in time when the event has occurred than another point in time. That is, the recording control unit 140 may determine the order of priority in accordance with the point in time when the object has been detected. In this way, it is possible to preferentially record a person who is more likely to have witnessed the event, a vehicle in which such a person is riding, or the like. Further, for example, the recording control unit 140 may assign a higher priority to the second captured data corresponding to the object that is located closer to the vehicle on which the recording control apparatus (the image capturing apparatus 200) is mounted than another object. In this case, for example, the captured data analysis unit 120 further determines a distance from the vehicle on which the recording control apparatus (the image capturing apparatus 200) is mounted to the object in addition to detecting the object. Further, when an object to be detected is the face of a person, the recording control unit 140 may determine the order of priority in accordance with the direction in which the detected face of the person is facing. In this case, for example, the captured data analysis unit 120 further determines the direction in which the detected face of the person is facing in addition to detecting the face of the person. Then, the recording control unit 140 refers to a result of the above determination. For example, the closer to the front the detected face of the person is facing, the higher priority that may be assigned by the recording control unit 140 to the second captured data captured at the point in time when this face of the person has been detected. When the face of a person is facing the front direction with respect to the image capturing apparatus 200, it is highly likely that the person is looking toward the vehicle on which the image capturing apparatus 200 is mounted. Therefore, it is possible to record a person who is more likely to have witnessed the event than other persons. Further, when the detected face of a person is facing the front direction, there is an advantage that the person whose face has been detected can be easily identified.

Incidentally, in order to reduce the consumption of the storage capacity, the second captured data may be the following data. For example, the second captured data may be a still image captured at the point in time when an object has been detected. That is, a still image of the video image in which the object has been detected may be stored as event recording data. Further, for example, the second captured data may be a moving image of which the frame rate is lower than that of the first captured data, or may be a moving image that is compressed with a compression rate higher than that of the first captured data. As described above, the recording control unit 140 may store a still image, a moving image of which the frame rate is lower than that of the first captured data, or a moving image compressed with a compression rate higher than that of the first captured data as the second captured data.

Figure 9:
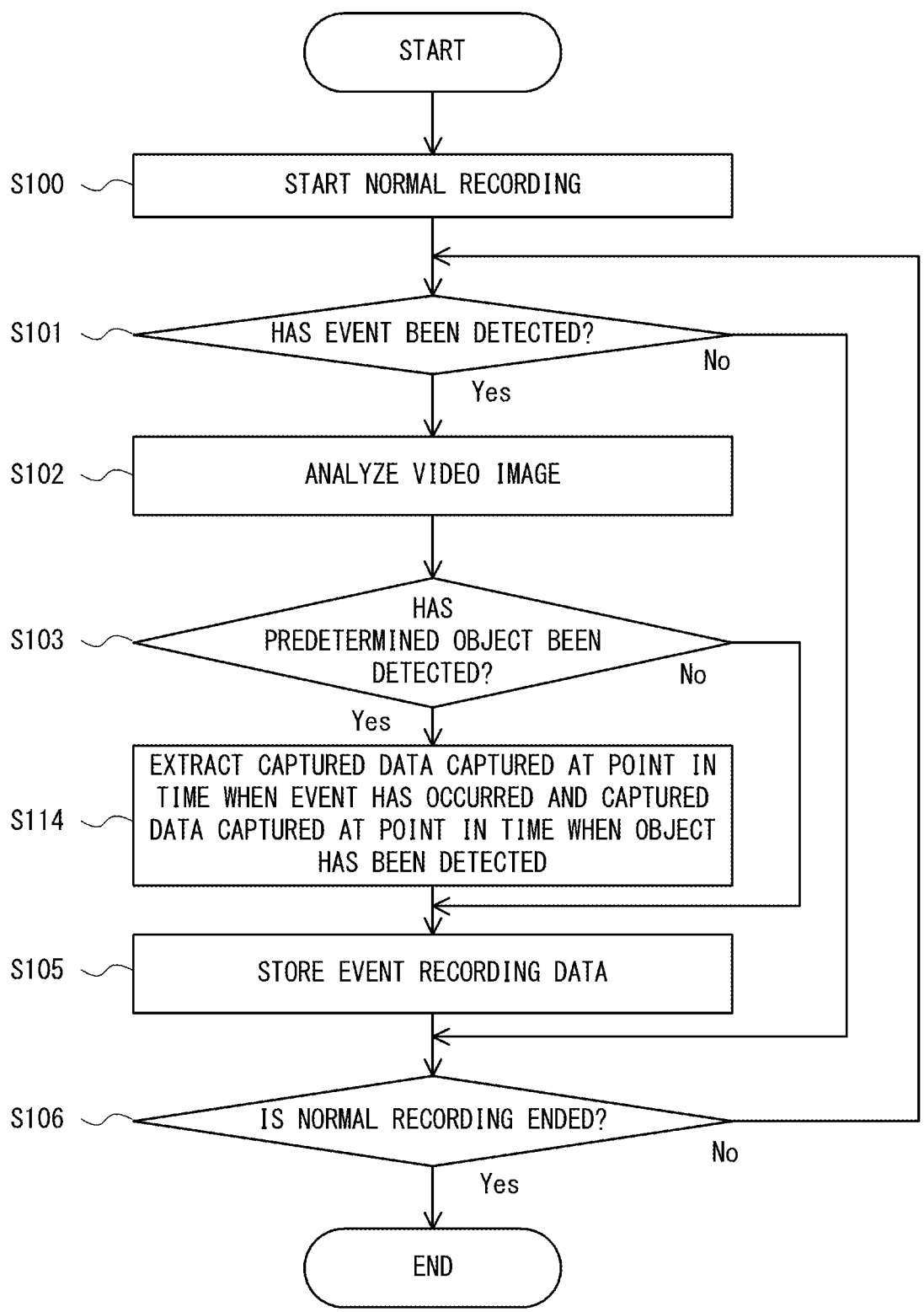
FIG. 9 is a flowchart showing an example of the operations performed by the recording control apparatus according to the embodiment.

Next, an operation example of the recording control apparatus 100 according to this embodiment will be described. FIG. 9 is a flowchart showing an example of operations performed by the recording control apparatus 100 according to this embodiment. The flowchart shown in FIG. 9 differs from the flowchart shown in FIG. 6 mainly in that Step S104 is replaced with Step S114. The difference between it and the flowchart shown in FIG. 6 will be described below.

In the flowchart shown in FIG. 9, if the captured data analysis unit 120 detects a predetermined object (Yes in Step S103), the process proceeds to Step S114.

In Step S114, the recording control unit 140 extracts, from a series of captured data, first captured data, which is captured data including the point in time when the event has occurred, and second captured data, which is captured data including the point in time when the object has been detected. After Step S114, the process proceeds to Step S105.

If the process proceeds from Step S114 to Step S105, in Step S105, the recording control unit 140 associates the first captured data with the second captured data that are extracted in Step S114, and stores them in the event recording unit 320 as one event recording data. Note that the above association of captured data may be performed by assigning a file name including a common name to each captured data, or may be performed by storing pieces of captured data to be associated with each other in the same folder. Further, data captured at a time close to the time when the first captured data has been captured may be associated, as the second captured data, with the first captured data, and stored.

On the other hand, if the process of Step S114 is skipped, that is, if in the case of No in Step S103, in Step S105, the recording control unit 140 stores only the first captured data in the event recording unit 320 as event recording data.

The third embodiment has been described above. According to this embodiment, the recording control unit 140 associates captured data captured at the point in time when an event has occurred with captured data captured at the point in time when an object has been detected, which captured data is different from the former captured data, and generates one event recording data. Therefore, according to this embodiment, it is possible to reduce the amount of data to be recorded and record contents useful for finding out about the situation of a traffic trouble.

The first to the third embodiments have been described above, and the following modifications may be made to these embodiments.

In the above-described embodiments, a detection range of an object stored as event recording data is a predetermined period of time (e.g., 10 minutes) starting at the timing when the event has been detected. That is, the detection range is a uniform time. However, this detection range may be defined by a distance starting from the position of a vehicle at the timing when the event has been detected. For example, the recording control unit 140 may store a video image including an object present within a predetermined distance (e.g., 100 m) from a point where the event has occurred as event recording data. That is, the recording control unit 140 may store event recording data based on the object detected from captured data captured for the period of time from the point in time when the vehicle is located the predetermined distance away from the position of the vehicle at the point in time when the event has occurred to the point in time when the event has occurred. In the following description, "the point in time when the vehicle is located the predetermined distance away from the position of the vehicle at the point in time when the event has occurred" will be referred to as a "range definition point in time". For example, although the above-described range definition point in time is a point in time before the event occurs, it may instead be a point in time after the event has occurred. When, for example, the range definition point in time is a point in time before the event occurs, a video image of the object detected from captured data captured for the period of time during which the vehicle is moving from a point 100 m before the point where the event has occurred to the point where the event has occurred can be stored as event recording data. Similarly, for example, when the range definition point in time is a point in time after the event has occurred, a video image of the object detected from captured data captured for the period of time during which the vehicle is moving from the point where the event has occurred to a point 100 m away from the point where the event has occurred can be stored as event recording data. The specification of the range definition point in time will now be described. For example, when time series data indicating position information of the vehicle for each time can be made available, such as by providing the vehicle with a Global Positioning System (GPS) in addition to the recording system 10, the recording control unit 140 specifies the range definition point in time as follows. In this case, the recording control unit 140 refers to this time series data and specifies a point in time when the vehicle was located a predetermined distance away from the position of the vehicle at the point in time when the event has occurred, thereby specifying the range definition point in time. Alternatively, the range definition point in time may be specified by other methods. For example, the recording control unit 140 may specify the range definition point in time by using speed information of the vehicle at the time when the event has occurred. In this case, the recording control unit 140 may estimate a point in time when the vehicle was located a predetermined distance away from the position of the vehicle at the point in time when the event has occurred by using the speed of the vehicle at the time when the event has occurred and the above-described predetermined distance, thereby specifying the range definition point in time. As described above, by storing event recording data based on the object detected from captured data captured in the period of time from the range definition point in time to the point in time when the event has occurred, it is possible to create event recording data which focuses on the object located on the periphery of the point where the event has occurred.

Further, in the above-described embodiments, the captured data analysis unit 120 analyzes captured data captured around the point in time when the event has occurred after a detection of the event. However, the captured data analysis unit 120 may continue to analyze captured data in real time. In this case, for example, the captured data analysis unit 120 notifies the recording control unit 140 about time information indicating at what point in time the video image includes the object each time the object is detected. Then, when the event has been detected, the recording control unit 140 determines a period of time for the video image of the event recording data based on the time information the captured data analysis unit 120 has notified the recording control unit 140 about.

Further, in the above-described embodiments, although the recording system 10 has been described as being a system mounted on a vehicle, the recording system 10 may not be mounted on the vehicle. For example, a monitoring camera for capturing a road such as an intersection may be used as the image capturing apparatus 200. In this case, the recording system 10 does not need to include the acceleration sensor 400. Instead, the event detection unit 130 detects the occurrence of an event, for example, by analyzing captured data using image recognition processing. For example, the occurrence of an event may be detected by analyzing captured data and thereby detecting a collision between objects such as vehicles. Alternatively, the event detection unit 130 may detect the occurrence of an event by analyzing sounds in the vicinity of the road to be captured by the image capturing apparatus 200. For example, the occurrence of an event may be detected by detecting a collision sound of a predetermined magnitude or more.

Note that the present invention is not limited to the above-described embodiments and modified examples thereof, and may be changed as appropriate without departing from the spirit of the present invention.

The whole or part of the embodiments disclosed above can be described as, but not limited to, the following supplementary notes.

(Supplementary Note 1)

A recording control apparatus comprising:
a captured data acquisition unit configured to acquire captured data from an image capturing apparatus;
an event detection unit configured to detect an occurrence of an event;
a captured data analysis unit configured to analyze the captured data and thereby detect a predetermined object included in the captured data; and
a recording control unit configured to store, as event recording data, the captured data including a video image at a point in time when the event has occurred and the captured data including a video image at a point in time when the object has been detected.

(Supplementary Note 2)

The recording control apparatus according to Supplementary note 1, wherein the recording control unit adjusts a period of time during which a video image is stored as event recording data so that it includes the point in time when the event has occurred and the point in time when the object has been detected.

(Supplementary Note 3)

The recording control apparatus according to Supplementary note 1 or 2, wherein
the captured data analysis unit analyzes at least the captured data of a video image captured before the point in time when the event has occurred, and
the recording control unit adjusts the period of time in which a video image is stored as event recording data so that it includes the point in time when the object has been detected, the object being included in the video image before the point in time when the event has occurred.

(Supplementary Note 4)

The recording control apparatus according to any one of Supplementary notes 1 to 3, wherein
the captured data analysis unit analyzes at least the captured data of a video image captured after the point in time when the event has occurred, and
the recording control unit adjusts the period of time during which a video image is stored as event recording data so that it includes the point in time when the object has been detected, the object being included in the video image after the point in time when the event has occurred.

(Supplementary Note 5)

The recording control apparatus according to any one of Supplementary notes 1 to 4, wherein the recording control unit adjusts the period of time during which a video image is stored as event recording data so that it includes a predetermined number or more of the objects.

(Supplementary Note 6)

The recording control apparatus according to any one of Supplementary notes 1 to 5, wherein the object is a license plate of a vehicle.

(Supplementary Note 7)

The recording control apparatus according to Supplementary note 6, wherein the recording control unit adjusts the period of time during which a video image is stored as event recording data so that it includes the point in time when the license plate has been detected, the license plate having a size equal to or larger than a predetermined size included in the video image.

(Supplementary Note 8)

The recording control apparatus according to any one of Supplementary notes 1 to 5, wherein the object is a face of a person.

(Supplementary Note 9)

The recording control apparatus according to Supplementary note 1, wherein the recording control unit associates first captured data with second captured data and stores them as event recording data, the first captured data being captured data including the point in time when the event has occurred, the second captured data being captured data including the point in time when the object included within a predetermined range from the point in time when the event has occurred has been detected.

(Supplementary Note 10)

The recording control apparatus according to Supplementary note 9, wherein when a plurality of the objects have been detected, the recording control unit associates the second captured data corresponding to a respective one of the detected objects with the first captured data and stores them as the event recording data.

(Supplementary Note 11)

The recording control apparatus according to Supplementary note 9, wherein when a plurality of the objects have been detected, the recording control unit associates a predetermined number of pieces of the second captured data with the first captured data and stores them as the event recording data, the predetermined number of pieces of the second captured data being selected in accordance with an order of priority among a plurality of pieces of the second captured data corresponding to the detected objects.

(Supplementary Note 12)

The recording control apparatus according to any one of Supplementary notes 9 to 11, wherein the recording control unit stores a still image, a moving image of which a frame rate is lower than that of the first captured data, or a moving image compressed with a compression ratio higher than that of the first captured data as the second captured data.

(Supplementary Note 13)

The recording control apparatus according to any one of Supplementary notes 9 to 12, wherein the recording control unit stores the event recording data based on the object detected from the captured data captured for a period of time from a point in time when a vehicle enters within a predetermined distance range from a position of the vehicle at the point in time when the event has occurred to the point in time when the event has occurred.

(Supplementary Note 14)

A recording control method comprising:

acquiring captured data from an image capturing apparatus;

detecting an occurrence of an event;

analyzing the captured data and thereby detecting a predetermined object included in the captured data; and storing, as event recording data, the captured data including a video image at a point in time when the event has occurred and the captured data including a video image at a point in time when the object has been detected.

(Supplementary Note 15)

A program for causing a computer to execute:

a captured data acquisition step of acquiring captured data from an image capturing apparatus;

an event detection step of detecting an occurrence of an event;

a captured data analysis step of analyzing the captured data and thereby detecting a predetermined object included in the captured data; and a recording control step of storing, as event recording data, the captured data including a video image at a point in time when the event has occurred and the captured data including a video image at a point in time when the object has been detected.

What is claimed is:

1. A recording control apparatus comprising:
   at least one memory storing instructions; and
   at least one processor configured to execute the instructions stored in the memory to:
   acquire captured data from an image capturing apparatus;
   detect an occurrence of an event;
   analyze the captured data and thereby detect predetermined objects included in the captured data;
   determine an object point in time when the objects have been detected; and
   store, as event recording data, the captured data including a video image at an event point in time when the event has occurred and the captured data including at least one of a video image at the object point in time of detection of the objects before the event point in time when the event has occurred and a video image at the object point in time of detection of the objects after the event point in time when the event has occurred,
   wherein the processor is further configured to execute the instructions to adjust a period of time during which a video image is stored to include the object point in time when the objects have been detected as event recording data so that it includes the event point in time when the event has occurred and the object point in time when the objects have been detected, which includes at least one of a predetermined preceding point in time before the event point in time when the event has occurred and a predetermined succeeding point in time after the event point in time when the event has occurred, and such that the event recording data includes the video image of a predetermined number or more of the objects, the predetermined number being two or greater, and
   wherein the object point in time is outside a range of time that extends from the predetermined preceding point in time to the predetermined succeeding point in time.

2. The recording control apparatus according to claim 1, wherein the processor is further configured to execute the instructions to:
   analyze at least the captured data of a video image captured before the event point in time when the event has occurred; and
   adjust the period of time in which a video image is stored as event recording data so that it includes the object point in time when the objects have been detected, the objects being included in the video image before the event point in time when the event has occurred.

3. The recording control apparatus according to claim 1, wherein the processor is further configured to execute the instructions to:
   analyze at least the captured data of a video image captured after the event point in time when the event has occurred; and
   adjust the period of time during which a video image is stored as event recording data so that it includes the object point in time when the objects have been detected, the objects being included in the video image after the event point in time when the event has occurred.

4. The recording control apparatus according to claim 1, wherein the objects include a license plate of a vehicle.

5. The recording control apparatus according to claim 4, wherein the processor is further configured to execute the instructions to adjust the period of time during which a video image is stored as event recording data so that it includes the object point in time when the license plate has been detected, the license plate having a size equal to or larger than a predetermined size included in the video image.

6. The recording control apparatus according to claim 1, wherein the objects are a face of a person.

7. The recording control apparatus according to claim 1, wherein the processor is further configured to execute the instructions to associate first captured data with second captured data and stores them as event recording data, the first captured data being captured data including the event point in time when the event has occurred, the second captured data being captured data including the object point in time when the objects included within a predetermined range from the event point in time when the event has occurred has been detected.

8. The recording control apparatus according to claim 7, wherein the processor is further configured to execute the instructions to, when a plurality of the objects have been detected, associate the second captured data corresponding to a respective one of the detected objects with the first captured data and stores them as the event recording data.

9. The recording control apparatus according to claim 7, wherein the processor is further configured to execute the instructions to, when a plurality of the objects have been detected, associate a predetermined number of pieces of the second captured data with the first captured data and stores them as the event recording data, the predetermined number of pieces of the second captured data being selected in accordance with an order of priority among a plurality of pieces of the second captured data corresponding to the detected objects.

10. The recording control apparatus according to claim 7, wherein the processor is further configured to execute the instructions to store a still image, a moving image of which a frame rate is lower than that of the first captured data, or a moving image compressed with a compression ratio higher than that of the first captured data as the second captured data.

11. The recording control apparatus according to claim 7, wherein the processor is further configured to execute the instructions to store the event recording data based on the objects detected from the captured data captured for a period of time from a point in time when a vehicle enters within a predetermined distance range from a position of the vehicle at the event point in time when the event has occurred to the event point in time when the event has occurred.

12. The recording control apparatus according to claim 1, wherein the objects detected before the predetermined preceding point in time when the event has occurred or after the predetermined succeeding point in time when the event has occurred is a witness to the event or a vehicle in which a witness to the event is riding.

13. A recording control method comprising:
acquiring captured data from an image capturing apparatus;
detecting an occurrence of an event;
analyzing the captured data and thereby detecting predetermined objects included in the captured data;
determining an object point in time when the objects have been detected; and
storing, as event recording data, the captured data including at least one of a video image at an event point in time when the event has occurred and the captured data including a video image at the object point in time of detection of the objects before the event point in time when the event has occurred and a video image at the object point in time of detection of the objects after the event point in time when the event has occurred,
wherein in the storing of the event recording data, a period of time during which a video image is stored to include the object point in time when the objects have been detected as event recording data is adjusted so that it includes the event point in time when the event has occurred and the object point in time when the objects have been detected, which includes at least one of a predetermined preceding point in time before the event point in time when the event has occurred and a predetermined succeeding point in time after the event point in time when the event has occurred, and such that the event recording data includes the video image of a predetermined number or more of the objects, the predetermined number being two or greater, and
wherein the object point in time is outside a range of time that extends from the predetermined preceding point in time to the predetermined succeeding point in time.

14. A non-transitory computer readable medium storing a program for causing a computer to execute:
a captured data acquisition step of acquiring captured data from an image capturing apparatus;
an event detection step of detecting an occurrence of an event;
a captured data analysis step of analyzing the captured data and thereby detecting predetermined objects included in the captured data;
a determination step of determining an object point in time when the objects have been detected; and
a recording control step of storing, as event recording data, the captured data including a video image at an event point in time when the event has occurred and the captured data including at least one of a video image at the object point in time of detection of the objects before the event point in time when the event has occurred and a video image at the object point in time of detection of the objects after the event point in time when the event has occurred,
wherein in the recording control step, a period of time during which a video image is stored to include the object point in time when the objects have been detected as event recording data is adjusted so that it includes the event point in time when the event has occurred and the object point in time when the objects have been detected, which includes at least one of a predetermined preceding point in time before the event point in time when the event has occurred and a predetermined succeeding point in time after the event point in time when the event has occurred, and such that the event recording data includes the video image of a predetermined number or more of the objects, the predetermined number being two or greater, and
wherein the object point in time is outside a range of time that extends from the predetermined preceding point in time to the predetermined succeeding point in time.

* * * * *